United States Patent [19]

Cox et al.

[11] 4,367,084
[45] Jan. 4, 1983

[54] THREADING MEANS FOR STRAND PULLING AND CHOPPING APPARATUS

[75] Inventors: Dan Cox; Bernard H. Jones, both of Anderson, S.C.

[73] Assignee: Owens-Corning Fiberglas Corporation, Toledo, Ohio

[21] Appl. No.: 329,541

[22] Filed: Dec. 10, 1981

[51] Int. Cl.³ .................... C03B 37/025; B23D 25/12
[52] U.S. Cl. ...................................... 65/10.2; 83/339; 83/913
[58] Field of Search .................... 65/10.2; 83/339, 916

[56] References Cited

U.S. PATENT DOCUMENTS 3,644,109  2/1972  Klink et al. ...................... 83/913 X

FOREIGN PATENT DOCUMENTS 50-27089  9/1975  Japan .
591418  2/1978  U.S.S.R. ................ 65/102

Primary Examiner—Robert L. Lindsay, Jr.
Attorney, Agent, or Firm—Ronald C. Hudgens; P. R. Cloutier; P. J. Rose

[57] ABSTRACT

A threading member secured to an end of a cot roll of a strand chopping apparatus and having a cam surface for laterally moving a strand to the periphery of the cot roll as the cot roll is rotated at normal speed and the strand is held in engagement with the cam surface.

4 Claims, 3 Drawing Figures

THREADING MEANS FOR STRAND PULLING AND CHOPPING APPARATUS

TECHNICAL FIELD

This invention relates generally to apparatus for pulling and chopping glass strands of filaments freshly attenuated from bushings or stream feeders supplying molten glass streams, and more particularly to a strand threading attachment mountable on a cot roll of such apparatus to enable threading of a strand between the cot roll and a chopping roll without reduction in the rotational speeds thereof.

BACKGROUND ART

FIGS. 1 and 2 of U.S. Pat. No. 3,644,109 disclose strand pulling and chopping apparatus in an arrangement including a single bushing and FIGS. 1 and 2 of U.S. Pat. No. 4,268,292 disclose strand pulling and chopping apparatus in another arrangement including as many as five bushings. The strand threading attachment of our invention may be used with a single or a plurality of bushings feeding the pulling and chopping apparatus.

Formerly when strand pulling and chopping apparatus was pulling and chopping strands from five bushings and a strand breakout occurred at one of the bushings, it was necessary to reduce the rotational speed of the puller - chopper temporarily in order to allow the operator to rethread the strand therein in a relatively safe manner after restarting the disrupted bushing. The reduction in speed increased the size of the filaments in the strands from the other four bushings. Chopped strand material with oversize filaments had to be diverted and scrapped.

DISCLOSURE OF INVENTION

In accordance with our invention, a generally conical threading member having a spiral groove in the outer conical surface is attached to the cylindrical shell or mandrel of the cot roll of the pulling and chopping apparatus. The threading member includes a relatively smaller helically grooved cylindrical portion extending from the apex of a spirally grooved conical portion, with the spiral-conical groove forming a smooth continuation of the helical groove. The threading member enables a strand from a restarted bushing to be safely threaded between cot and chopping rolls of the apparatus without reduction in the normal operating speeds thereof. Rethreading is thus easier even in a single bushing arrangement, but elimination of scrap from other bushings is a bigger advantage in multi-bushing arrangements.

BRIEF DESCRIPTION OF DRAWINGS

The invention is described hereinafter in greater detail with reference to the accompanying drawings in which.

BEST MODE OF CARRYING OUT INVENTION

Figure 2:
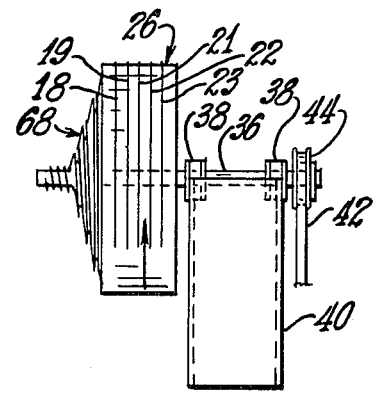
FIG. 2 is an elevational view taken generally along the line 2—2 of FIG. 1.
Figure 1:
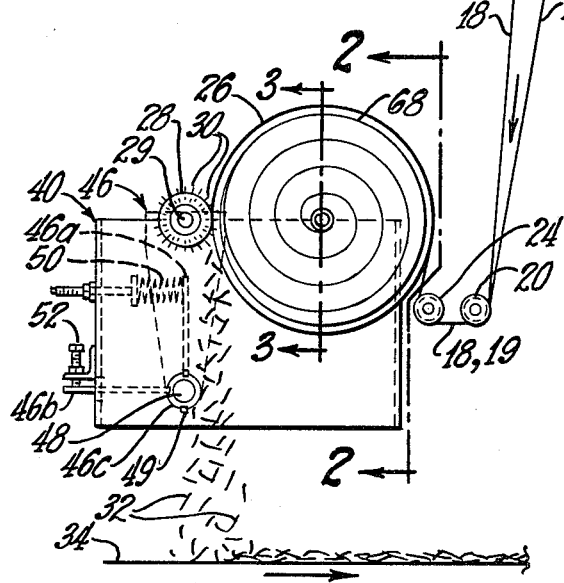
FIG. 1 is a schematic elevational view of strand pulling and chopping apparatus including threading means constructed in accordance with the invention.

With reference to the drawings, FIG. 1 fragmentarily shows a stream feeder or bushing 10 having a plurality of orificed tips 12 in a bottom wall portion thereof for supplying streams of molten glass for attenuation into glass filaments 14. The filaments 14 are drawn over a roll of a size applicator 16 and gathered into a strand 18 at a groove in a gathering shoe 20. Glass filaments 15 from another bushing (not shown) are drawn over the roll of a size applicator 17 and gathered into a strand 19 at another groove in the gathering shoe 20. Additional similarly formed strands 21, 22, and 23 are shown in FIG. 2.

From the gathering shoe 20 the strands pass beneath and partially around a rotatably mounted idler roll 24 and then over half-way around a rotatably mounted and driven roll 26 and between the cot roll and a cooperating rotatably mounted cutting or chopping roll 28 having a plurality of cutting blades 30 spaced all around the periphery thereof in a conventional manner. The resulting chopped strands 32 are normally collected in cartons, but for convenience are shown being collected on and carried away by a traveling conveyor belt 34.

The cot roll 26 is fixedly mounted on a shaft 36 rotatably mounted in two bearings 38 (FIG. 2) supported by a housing 40. The shaft 36 is driven by conventional motor, pulley, and belt driving means of which only a belt 42 and pulley 44 are shown in FIG. 2. The chopping roll 28 is biased toward the cot roll 26. It is mounted on a shaft 29 carried by a pair of rocker arms 46 fixedly mounted on a pivotable shaft 48 secured in the housing 40. A generally vertical arm 46a mounted in a collar 46c on the shaft 48 is biased clockwise as viewed in FIG. 1 by an adjustably mounted compression spring 50. An adjustably mounted set screw 52 limits movement of the rocker arms 46 by engagement with a generally horizontal arm 46b carried by the collar 46c. The collar 46c is fixed to the shaft 48 by a set screw 49. Only one of the rocker arms 46 is visible in FIG. 1.

Figure 3:
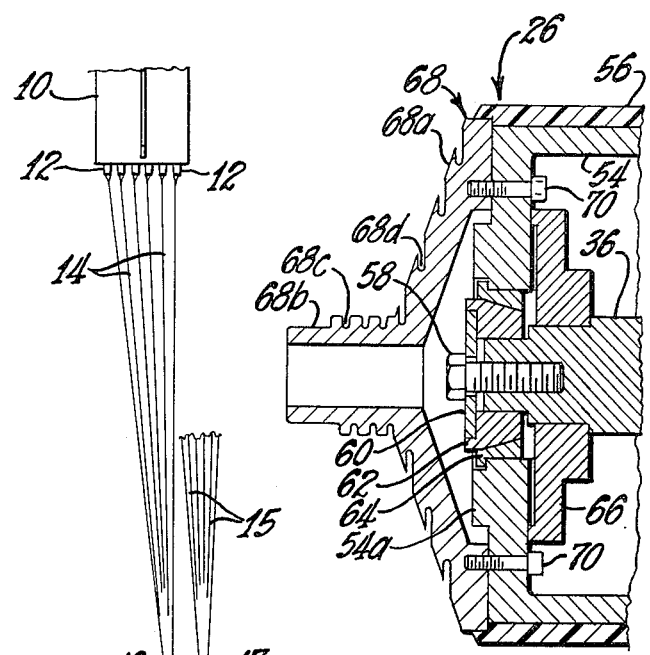
FIG. 3 is an enlarged fragmentary sectional view taken generally along the line 3—3 of FIG. 1.

The cot roll 26 is shown in greater detail in FIG. 3 and includes a cyclindrical shell or mandrel 54 covered by a resilient polyurethane sleeve 56. The shell 54 is secured to a double-stepped end portion of the shaft 36 by a screw 58 and washer 60. The screw 58 is threaded into the respective end portion of the shaft 36 axially thereof and forces a male cyclindrical wedge member 62 on the smallest, extreme end portion of the shaft 36 against a flanged larger female cylindrical wedge member 64 fixedly secured in an end wall portion 54a of the shell 54. The shell 54 is thus centered on the shaft 36 and securely clamped against a face plate 66 mounted on an intermediately sized portion of the shaft 36. Preferably the washer 60 and the male wedge member 62 are made captive on the screw 58 and the shell 54 can be replaced when the sleeve 56 is worn out by merely unscrewing the screw 58 from the shaft 36.

In accordance with our invention, a hollow generally conical strand threading member 68 is secured to the end wall portion 54a of the shell 54. The member 68 includes a conical portion 68a secured at its base to the end wall portion 54a by a plurality of screws 70 and a cylindrical portion 68b coaxial with the conical portion 68a at the apex thereof. A continuous groove in the outer surface of the member 68 provides a cam surface for laterally moving a strand to the periphery of the cot roll 26 and includes a helical groove 68c in the cylindrical portion and a spiral-conical groove 68*d* in the conical portion.

The threading member 68 allows an operator to thread a strand from a restarted bushing between the cot roll 26 and chopping roll 28 safely and easily without reducing the speed of the cot and chopping rolls. All he has to do is to gather the filaments from the restarted bushing, thread them into the proper groove in the gathering shoe 20 to form a strand, wrap the end of the strand partially around the idler roll 24, and then loop the strand over the cylindrical portion 68*b* of the threading member 68 while hanging on to the end of the strand. Because the cot roll 26 and threading member 68 are rotating at their normal speed, the strand will be picked up very rapidly by the groove 68*c* and work its way through the spiral groove 68*d* and up around the resilient sleeve 56 of the cot roll 26. As soon as the strand reaches the cutting blades 30, regular chopping of that strand will be initiated and the operator merely has to discard the cut-off end of the strand he will be holding. Although the outer end of the spiral groove 68*d* is at a smaller radius than the outer radius of the resilient sleeve 56, the strand readily works its way onto the sleeve 56 due to centrifugal momentum and centers itself on the sleeve 56 according to its groove in the gathering shoe 20.

Various modifications may be made in the apparatus shown and described without departing from the spirit and scope of the invention.

We claim:

1. Strand pulling and chopping apparatus comprising a rotatably mounted cot roll, a rotatably mounted chopping roll cooperable with the cot roll to attenuate glass filaments from molten glass streams supplied by a bushing, draw the filaments through a gathering shoe to form a strand, and draw the strand partially around the cot roll and between the two rolls to chop the strand into discrete lengths, means for rotatably driving one of the rolls, and means for threading a strand safely and easily between the two rolls while they are rotating at their normal operating speeds for attenuating glass filaments and chopping a strand, said threading means comprising a threading member secured to an outer free end portion of the cot roll and having a cam surface for laterally moving a strand to the periphery of the cot roll as the member is rotated therewith at the normal operating speed thereof and the strand is held in engagement with the cam surface.

2. Apparatus as claimed in claim 1 wherein said threading member includes a generally conical portion secured at its base to the cot roll coaxially therewith and a generally cylindrical portion coaxial with the conical portion and extending outwardly therefrom adjacent the apex thereof, and said cam surface comprises a helical groove in the cylindrical portion and a spiral-conical groove in the conical portion continuous with the helical groove.

3. In strand chopping apparatus including rotatably mounted cooperable cot and chopping rolls each having a normal operating speed, the improvement comprising a threading member secured to an outer free end portion of the cot roll and having a cam surface for laterally moving a strand to the periphery of the cot roll as the member is rotated therewith at the normal operating speed thereof and the strand is held in engagement with the cam surface.

4. Apparatus as claimed in claim 3 wherein said threading member includes a generally conical portion secured at its base to the cot roll coaxially therewith and a generally cylindrical portion coaxial with the conical portion and extending outwardly therefrom adjacent the apex thereof, and said cam surface comprises a helical groove in the cylindrical portion and a spiral-conical groove in the conical portion continuous with the helical groove.

* * * * *